United States Patent
Prakash et al.

(10) Patent No.: US 9,887,997 B2
(45) Date of Patent: Feb. 6, 2018

(54) WEB AUTHENTICATION USING CLIENT PLATFORM ROOT OF TRUST

(75) Inventors: Gyan Prakash, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 13/992,811

(22) PCT Filed: Dec. 28, 2011

(86) PCT No.: PCT/US2011/067592
§ 371 (c)(1),
(2), (4) Date: Jun. 4, 2014

(87) PCT Pub. No.: WO2013/100967
PCT Pub. Date: Jul. 4, 2013

(65) Prior Publication Data
US 2014/0289831 A1   Sep. 25, 2014

(51) Int. Cl.
*H04L 29/06* (2006.01)
*H04L 9/32* (2006.01)
*G06F 21/44* (2013.01)

(52) U.S. Cl.
CPC .......... *H04L 63/0876* (2013.01); *G06F 21/44* (2013.01); *H04L 9/3228* (2013.01); *H04L 63/168* (2013.01); *G06F 2221/2129* (2013.01)

(58) Field of Classification Search
CPC .. H04L 63/0876; H04L 63/168; H04L 9/3228
See application file for complete search history.

(56) References Cited

U.S. PATENT DOCUMENTS

| | | | |
|---|---|---|---|
| 8,893,255 B1* | 11/2014 | Martini | 726/12 |
| 2002/0174209 A1* | 11/2002 | Sesek et al. | 709/223 |
| 2006/0179315 A1 | 8/2006 | Sasage et al. | |
| 2007/0174630 A1* | 7/2007 | Shannon | G06F 21/31 713/183 |

(Continued)

FOREIGN PATENT DOCUMENTS

| CN | 1507732 A | 6/2004 |
|---|---|---|
| CN | 101681333 A | 3/2010 |

(Continued)

OTHER PUBLICATIONS

"International Application Serial No. PCT/US2011/067592, Search Report dated Sep. 21, 2012", 3 pgs.

(Continued)

*Primary Examiner* — Anthony Brown
*Assistant Examiner* — William Corum, Jr.
(74) *Attorney, Agent, or Firm* — Schwegman Lundberg & Woessner, P.A.

(57) ABSTRACT

Systems and methods for performing web authentication using a client platform root of trust are disclosed herein. Website and user validity and integrity may be authenticated based on the user device's attempt to access the website. A user device may securely access the website once the user device is successfully authenticated with a server. In an embodiment, the user device may perform an authentication of the website to ensure the website is a valid entity.

20 Claims, 4 Drawing Sheets

(56) References Cited

U.S. PATENT DOCUMENTS

| | | | |
|---|---|---|---|
| 2008/0028444 A1 | 1/2008 | Loesch et al. | |
| 2008/0109657 A1* | 5/2008 | Bajaj | H04L 9/3213 |
| | | | 713/168 |
| 2008/0270571 A1 | 10/2008 | Walker et al. | |
| 2009/0300744 A1* | 12/2009 | Guo et al. | 726/7 |
| 2010/0100935 A1 | 4/2010 | Sato et al. | |
| 2010/0199086 A1* | 8/2010 | Kuang et al. | 713/155 |
| 2010/0241865 A1 | 9/2010 | Chang et al. | |
| 2011/0145930 A1* | 6/2011 | Gnech et al. | 726/28 |
| 2011/0154459 A1* | 6/2011 | Kuang et al. | 726/6 |
| 2011/0247045 A1* | 10/2011 | Rajagopal et al. | 726/1 |
| 2014/0173709 A1* | 6/2014 | Eldar et al. | 726/7 |
| 2014/0250490 A1* | 9/2014 | Baca et al. | 726/1 |

FOREIGN PATENT DOCUMENTS

| | | |
|---|---|---|
| CN | 104025503 A | 9/2014 |
| EP | 2798772 A1 | 11/2014 |
| JP | 2006211588 A | 8/2006 |
| JP | 2008186260 A | 8/2008 |
| JP | 2008269096 A | 11/2008 |
| JP | 2010015263 A | 1/2010 |
| JP | 2010117873 A | 5/2010 |
| JP | 2011076195 A | 4/2011 |
| TW | 1355174 B | 12/2011 |
| TW | 201347499 A | 11/2013 |
| TW | 1477137 B | 3/2015 |
| WO | WO-2008064403 A1 | 6/2008 |
| WO | WO-2008099756 A1 | 8/2008 |
| WO | WO-2013100967 A1 | 7/2013 |

OTHER PUBLICATIONS

"International Application Serial No. PCT/US2011/067592, Written Opinion dated Sep. 21, 2012", 4 pgs.

"Chinese Application Serial No. 201180075948.8, Office Action dated Sep. 1, 2016", w/English Translation, 10 pgs.

"Chinese Application Serial No. 201180075948.8, Response filed Jan. 13, 2017 to Office Action dated Sep. 1, 2016", w/English Translation, 10 pgs.

"European Application Serial No. 11878354.7, Amendment filed Apr. 16, 2016", 11 pgs.

"European Application Serial No. 11878354.7, Extended European Search Report dated Sep. 18, 2015", 7 pgs.

"International Application Serial No. PCT/US2011/067592, International Preliminary Report on Patentability dated Jul. 10, 2014", 6 pgs.

"Japanese Application Serial No. 2014-550250, Office Action dated Jul. 28, 2015", w/English Translation, 3 pgs.

"Japanese Application Serial No. 2014-550250, Response filed Oct. 13, 2015 to Office Action dated Jul. 28, 2015", w/English Translation, 18 pgs.

"Taiwanese Application Serial No. 101148119, Office Action dated Aug. 11, 2014", w/English Translation, 11 pgs.

"Taiwanese Application Serial No. 101148119, Response filed Nov. 12, 2014", w/English Claims, 11 pgs.

"European Application Serial No. 11878354.7, Response filed Aug. 21, 2017 to Communication Pursuant to Article 94(3) EPC dated Feb. 10, 2017", 11 pgs.

\* cited by examiner

WEB AUTHENTICATION USING CLIENT PLATFORM ROOT OF TRUST

This application is a U.S. National Stage Filing under 35 U.S.C. 371 from International Application No. PCT/US2011/067592, filed on Dec. 28, 2011, which is incorporated herein by reference in its entirety.

BACKGROUND

Accessing personal information online has increasingly become common place, as it has become a convenient and efficient way to manage one's affairs. For example, users may access their bank accounts online to view balances and transactions, transfer money, pay bills, etc. Although the ability to access such information provides convenience, it also raises the potential of security threats to sensitive information.

One example of a threat to personal information is a phishing attack, in which a user may be taken to or redirected to a fake website to gather personal information such as a username, password, social security number, date of birth, credit card information, etc. For example, communications purporting to be from a popular social website, auction site, online payment processor, etc. may be used to lure an unsuspecting user into providing personal information.

Another example of a threat to personal information is a pharming attack, in which a user may be redirected to a fake website by a false domain name service (DNS) record, effectively redirecting the traffic from the intended website to a the fake website. For example, this may be done by changing a DNS host file after breaching the DNS server.

Some techniques for preventing these attacks may include browser-based website verification performed via a browser plug-in. However, these verification techniques may be unable to prevent pharming attacks. In some cases, phishing may be avoided by using secure socket layer (SSL) or transport layer security (TLS) with strong public key infrastructure (PKI) encryption (e.g., using public key certificates), where a uniform resource identifier (URI) (e.g., a uniform resource locator (URL)) for a website is used as an identifier. Generally, secure authentication using SSL or TLS and certificates may include indicating that a connection is in authentication mode, indicating which website a user is connected to, and indicating which authority (e.g., certificate authority) authenticates the identity of the website. However, this authentication process may be easy to circumvent, because the authentication is typically confirmed by the user, introducing user error. Additionally, because these current techniques for preventing attacks are purely software-based, they may be ineffective against some threats to personal information (e.g., if the user's own computer is compromised).

DETAILED DESCRIPTION

Figure 1:
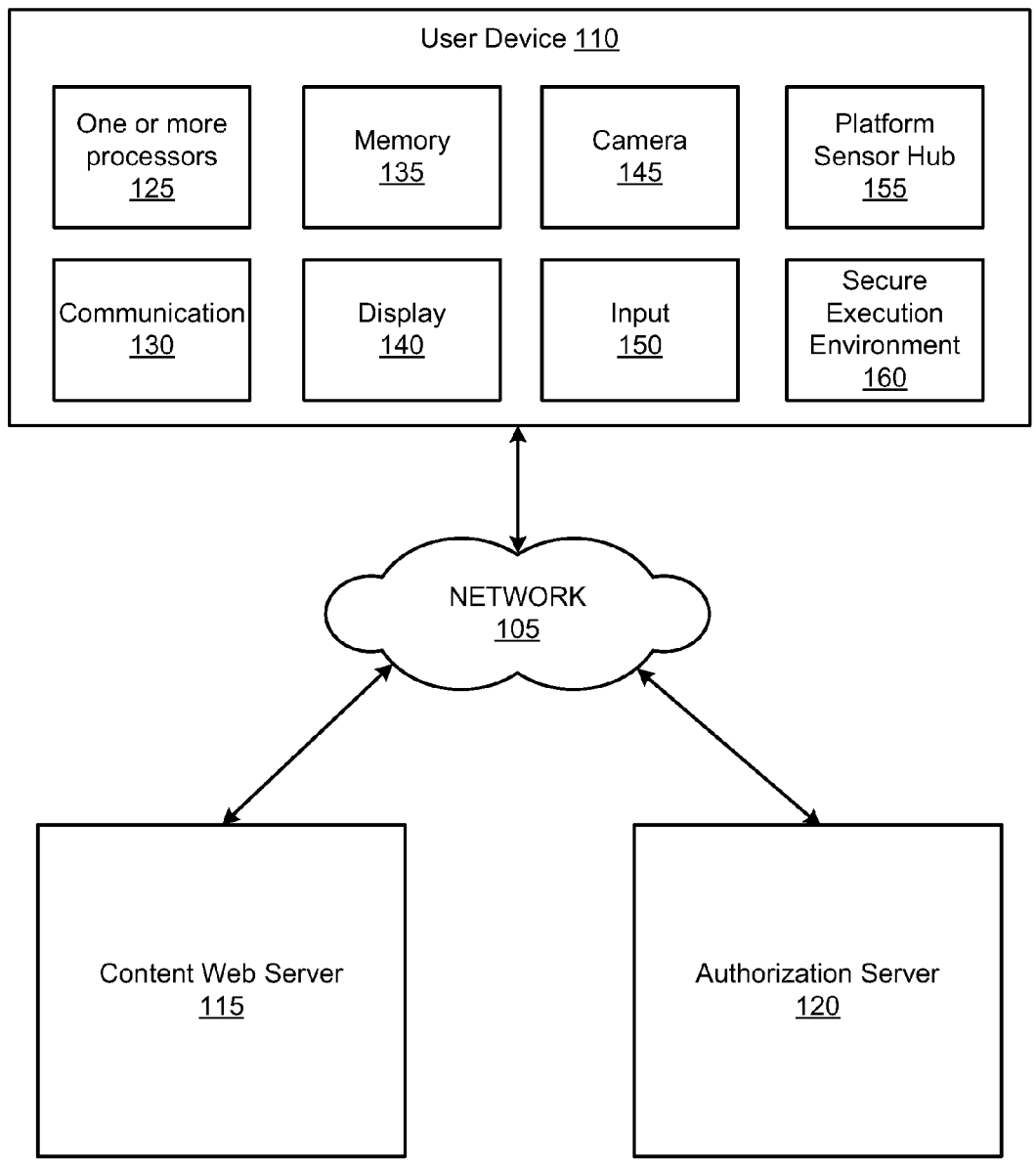
FIG. 1 illustrates an example of a system for utilizing a secure execution environment in accordance with example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Several of the embodiments described herein provide techniques for web authentication using a client platform root of trust. When a user requests access to a website having personal information of the user, the server of the website may authenticate the user before allowing access. The website may be any website that a user may use to access personal information. For example, the website may be a bank website for accessing account information. The authentication may include authenticating the particular user device used to access the website. In an embodiment, the authentication of the user device may be performed using a secure execution environment on the user device. The secure execution environment may be a hidden environment (e.g., not visible or directly accessible, in whole or part, by the user, the operating system, or other applications running on the user device) on the user device upon which web authentication may occur.

Web authentication using a particular user device may occur by provisioning the particular user device to be authenticated with the server of the website. When provisioning a user device, a user may provide credentials used to log in to the website. The credentials used to log in to a website may be any credentials for a user that may help verify the identity of the user. Examples of credentials may include any one or more of the following: a username; a password; a social security number; an account number; a date of birth; credit card information; a billing address; a phone number; etc. Additionally, the server may determine whether the device belongs to the user. For example, the server may verify whether the user owns the device by determining whether the device is in a particular geographic area (e.g., address, building, city, state, global positioning system (GPS) coordinates, etc.) associated with the device or the user. After successful verifications, the server may generate a device-specific URI (e.g., a web address) specific to the user device. This device-specific URI may be stored in both the secure execution environment of the user device and at the server. The stored device-specific URI may be used for web authentication.

When a user attempts to access a website using a user device that has been provisioned for the website, the user may use the device-specific URI stored in the secure execution environment to access the website securely. The server may receive the device-specific URI from the secure execution environment of the device and may verify that the URI is valid for the device that is being used to access the website. Web authentication that includes a device-specific authorization module increases security by ensuring that the entity accessing the user's information is authorized to do so.

Additionally, the server may send the device-specific URI to the user device and the secure execution environment on the device may verify that the website that will be accessed is the intended website and not a fake website to which the user may have been redirected.

For example, FIG. 1 illustrates an example of a system 100 for using a secure execution environment 160. The system 100 may include a user device 110 in communication with a content web server 115 and an authorization server 120 via a network 105. In an embodiment, the authorization server 120 may include an authorization module arranged to perform any one or more of the operations of the authorization of the authorization server 120. The network 105 may be any communication network for communicating between entities (e.g., the Internet, local area network, etc.).

The user device 110 may be any user device arranged (e.g., configured) to access a website. User device 110 examples may include, but are not limited to: mobile devices (e.g., smartphones, portable digital assistants (PDAs), tablet computers); desktop computers; laptop computers; televisions; set-top boxes; media consoles; etc. The user device 110 may include one or more processors 125 in communication with a memory 135. The memory 135 may include any type of memory to store instructions executable by the one or more processors 125, applications, or operating systems of the user device 100. The memory 135 may also store data, such as in a filesystem (e.g., one or more data structures arranged to store files). The user device 110 may include one or more communication modules 130 (e.g., antenna, circuits arranged to enable Wi-Fi®, Wi-Max®, or cellular communications, etc.), a display module 140 (e.g., processing hardware, screen, etc.) arranged to display information to a user, a camera module 145 for capturing photos and/or video, and one or more input modules 150 arranged to receive inputs from a user (e.g., microphone, keypad, etc.). The user device 110 may include a platform sensor hub 155, which may be connected to, or include, inertial sensors, pressure sensors, ambient light sensors, proximity sensors, global positioning system (GPS) devices, etc.

The user device 110 may include a secure execution environment 160. The secure execution environment 160 may be arranged to provide host-independent tamper-proof secure computing and storage capabilities. The secure execution environment 160 may include one or more processors or instructions on machine (e.g., computer) readable media arranged to perform authentication of the user device 110 to a website. For example, the secure execution environment 160 may store the device-specific URI provisioned to the user device 110. In an embodiment, the secure execution environment 160 may store an encrypted version of the device-specific URI, such as a device-specific URL signature hash. The encryption version of the device-specific URI may be encrypted using any type of encryption mechanism.

The components of the user device 110 may be contained within the user device 110 as one or more chips. In an embodiment, the user device 110 may contain one or more processors including: multi-core processors, main core processors, or ultra-low power core processors, etc.

The content web server 115 may be any web server arranged to provide access to one or more websites for an entity. For example, the content web server 115 may provide access to content including, for example, personal information, user accounts, etc.

The authorization server 120 may be any web server arranged to perform the authorization of the user device 110 (e.g., via an authorization module). The authorization server 120 may store user device information such as, tamper resistant software (TRS), the device-specific URI, encryption keys, etc. In an embodiment, the authorization server 120 may be a third-party server arranged to perform authorization for any number of content web servers from any number of entities. In an embodiment, the operations performed by the content web server 115 and the authorization server 120 may be performed by the same server (e.g., computer).

Figure 2:
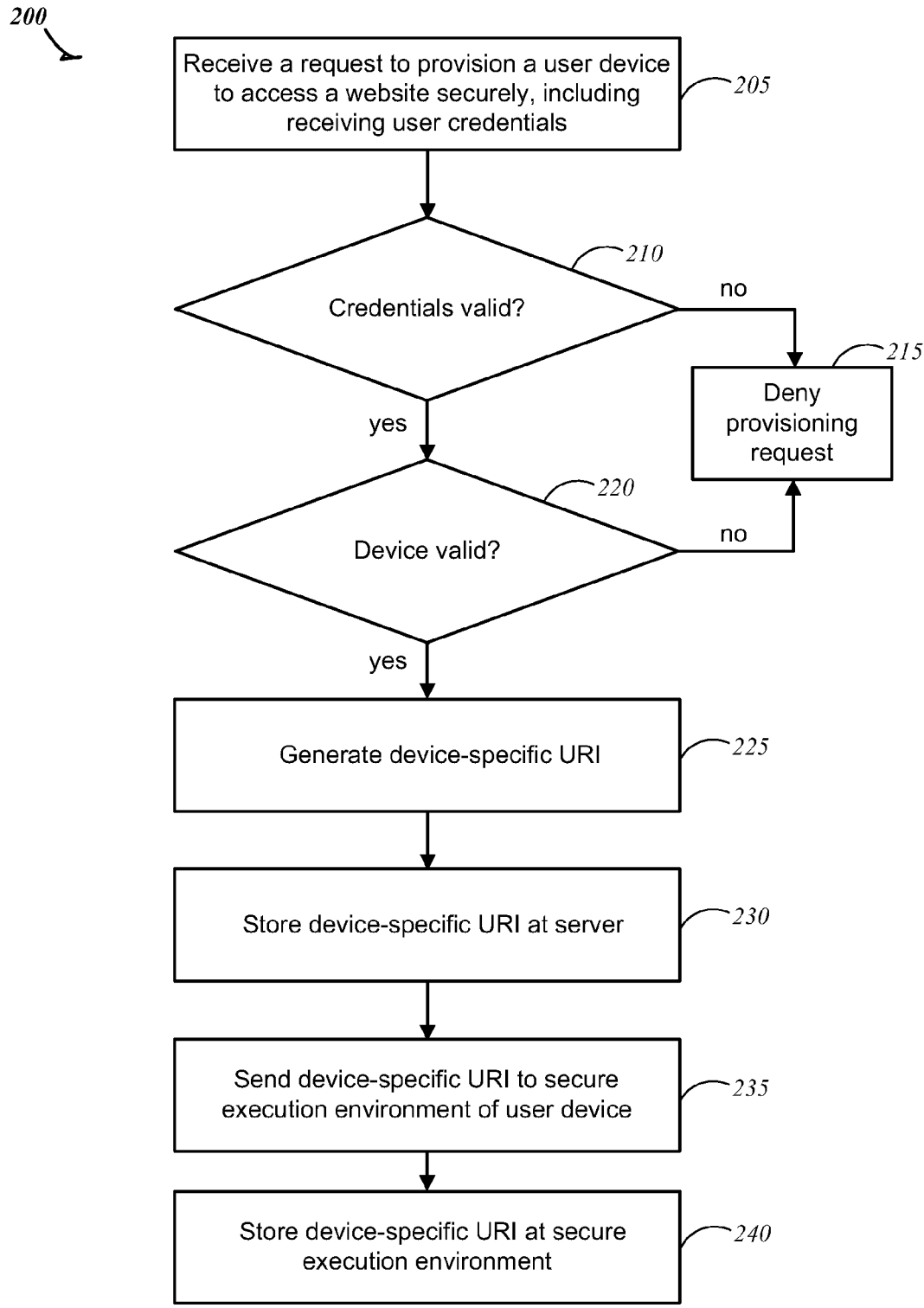
FIG. 2 illustrates an example of a method for provisioning a user device to securely access a website in accordance with example embodiments.

FIG. 2 illustrates an example of a method 200 for provisioning a user device 110 to securely access a website. In operation 205, the authorization server 120 may receive a request to provision the user device 110 to access a website securely. Receiving the request may include receiving user credentials from the user. The user credentials received may be any credentials for verifying the identity of the user (e.g., username, password, etc.).

In operation 210, the authorization server 120 may determine whether the credentials are valid. This may include determining whether the credentials match a particular user account of the website. If the credentials are not valid, in operation 215, the request to provision the device may be denied. In operation 220, if the credentials are valid, the authorization server 120 may determine whether the device is valid. In an embodiment, this may include determining whether the device to be provisioned is owned by the user. For example, the authorization server 120 may determine whether the geographical location of the device matches the location in which the user resides or receives service. If the device is not valid, in operation 215, the request to provision the device may be denied.

In operation 225, if the device is valid, the authorization server 120 may generate a device-specific URI for accessing the website. The device-specific URI may be generated using any mechanisms for generating a URI specific to a particular device, such as a random-number generator, a hash of an identifier of the user device 110, etc. In an embodiment, the device-specific URI is an encrypted web address specific to the user device 110 using any type of encryption. In operation 230, the authorization server 120 may store this device-specific URI. In an embodiment, the authorization server 120 may store one or more of encryption keys, identifiers for the user, identifiers for the user device 110, TRS-based root of trust, etc., for web authentication of the user device 110.

In operation 235, the authorization server 120 may send the device-specific URI and any encryption keys to the secure execution environment 160 of the user device 110. In operation 240, the secure execution environment 160 may store the device-specific URI and any encryption keys for web authentication with the website. This device-specific URI may be encrypted with the user device's public key such that only that specific user device may receive the URI signature for the device-specific URI securely.

Figure 3:
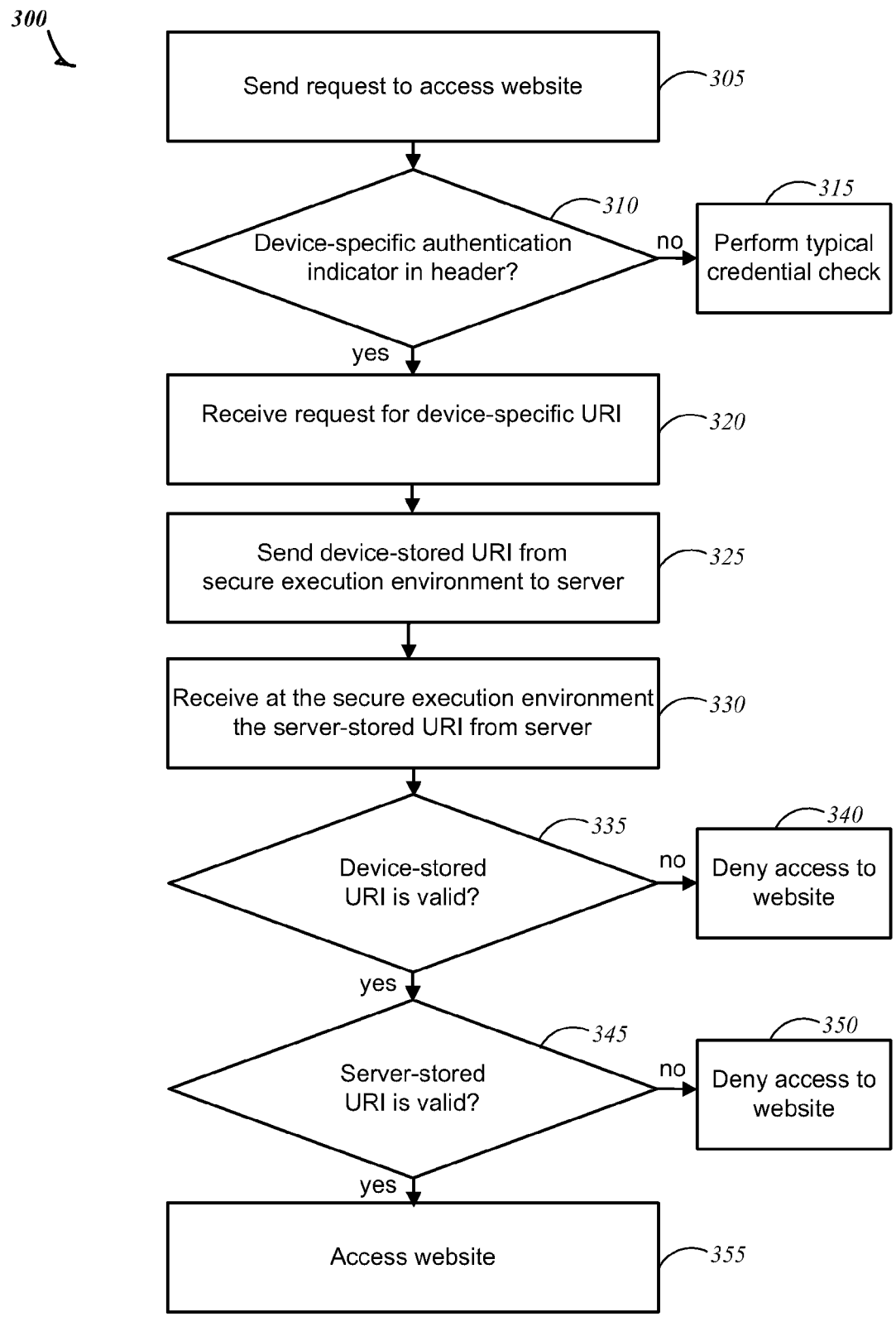
FIG. 3 illustrates an example of a method for securely accessing a website using a provisioned user device in accordance with example embodiments.

FIG. 3 illustrates an example of a method 300 for securely accessing a website using a provisioned user device 110 storing a device-specific URI and any encryption keys at the secure execution environment 160. In operation 305, the secure execution environment 160 may send a request to access the website to the authorization server 120. In an embodiment, the request may include a hypertext transfer protocol (HTTP) header handshake. The request may also include a device-specific authentication indicator (e.g., flag) indicating that the extended security of the device-specific authentication is included in the header. For example, a user may request to visit a generic website for a bank (e.g., http://www.bankname.com). The request may include the device-specific authentication indicator indicating that extended security of the device-specific authentication should be used.

In operation 310, the authorization server 120 may determine whether the request includes a valid device-specific authentication indicator in the header. If the header does not properly include the device-specific authentication indicator, in operation 315, the authorization server 120 may direct the user to proceed with the credential check for a non-provisioned device (e.g., using TLS). For example, the user may log in to an account at the website using credentials for the non-extended security authentication (authentication that is not based on the user device 110). In an embodiment, if the header does not properly include the device-specific authentication indicator, the authorization server 120 may initiate the provisioning process (e.g., as described above). In an embodiment, if the header does not properly include the device-specific authentication indicator, the authorization server 120 may deny access to the website.

If the authorization server 120 determines that the header properly includes the indicator, in operation 320, the secure execution environment 160 may receive a request for the device-specific URI from the authorization server 120 (e.g., http://www.bankname.com/deviceURL012345). In operation 325, the secure execution environment 160 may send the device-stored device-specific URI to the authorization server 120 in response to the request of operation 320. In an embodiment, an encrypted device-specific URI (e.g., a URL signature hash) may be sent to the authorization server 120.

In operation 330, the secure execution environment 160 may receive the server-stored device-specific URI from the authorization server 120. This may be received so that the secure execution environment 160 may verify that the website to be accessed is the intended website and that the user has not been redirected to another website (e.g., as in a pharming attack).

In operation 335, the authorization server 120 may determine whether the device-stored URI is valid. A device-stored URI may be valid if it matches the device-specific URI stored at the authorization server 120. The authorization server 120 may decrypt the received the device-stored URI using the encryption key stored at the authorization server 120. If the decrypted device-stored URI matches the URI stored at the authorization server 120, the device-stored URI may be determined to be valid. If the device-stored URI is determined to be invalid, in operation 340, the authorization server 120 may deny access to the website based on the device-specific web authentication. In an embodiment, the user may be directed to perform the non-extended security authentication credential check (e.g., as described in operation 315).

If the device-stored URI is determined to be valid, in operation 345, the secure execution environment 160 may also determine whether the received server-stored URI is valid. The secure execution environment 160 may decrypt the received server-stored URI using the encryption key stored at the secure execution environment 160. If the decrypted server-stored URI matches the URI stored at the secure execution environment 160, the server-stored URI may be determined to be valid. This may ensure that the user has not been redirected to another website (e.g., a malicious website). If the server-stored URI is determined to be invalid, in operation 350, the secure execution environment 160 may deny access to the website based on the device-specific web authentication. In an embodiment, the user may, instead of being denied access to the website, proceed with the non-extended security authentication credential check (e.g., as described in operation 315).

If the server-stored URI is determined to be valid, in operation 355, the user device 110 may securely access the website. In an embodiment, access may be automatic without requiring additional information from the user. In an embodiment, access may be provided after the user enters any requested user credentials. In an embodiment, the device-specific authentication may be an extension to SSL or TLS. In an embodiment, access to the website may be allowed based on a one-time password (OTP) process. For example, the authorization server 120 may send a URI that is valid to access the website for a particular (e.g., defined, temporary, etc.) period of time. The URI (e.g., OTP URI to provide website access during the particular period of time) may be generated by the authorization server 120 by appending a user device identifier and a timestamp for the time of authentication appended to the website's address. In an embodiment, the OTP URI may include the user device identifier and the timestamp based on an OTP algorithm such that the URI may only be used to access the website for the particular period of time.

Figure 4:
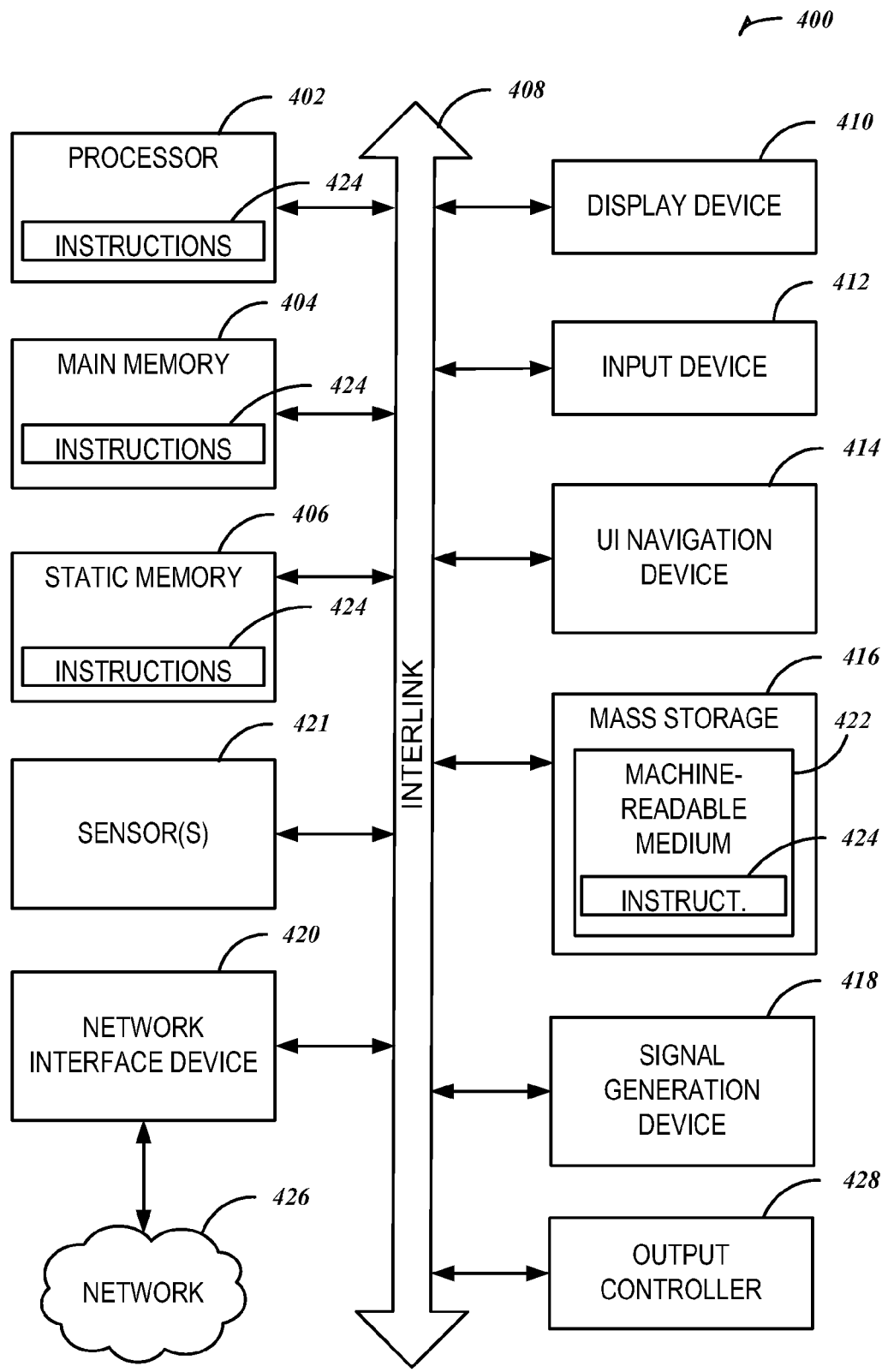
FIG. 4 illustrates a block diagram of an example of a machine upon which any one or more of the techniques discussed herein may be performed in accordance with example embodiments.

FIG. 4 illustrates a block diagram of an example of a machine 400 upon which any one or more of the techniques (e.g., methodologies) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 400 may include at least one hardware processor 402 (e.g., a central processing unit (CPU), a graphics processing unit (GPU), a hardware processor core, or any combination thereof), a main memory 404, and a static memory 406, some or all of which may communicate with each other via an interlink 408 (e.g., a link or a bus). The machine 400 may further include a display device 410, an input device 412 (e.g., a keyboard), and a user interface (UI) navigation device 414 (e.g., a mouse). In an example, the display device 410, input device 412, and UI navigation device 414 may be a touch screen display. The machine 400 may additionally include a mass storage (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The mass storage 416 may include a machine-readable storage medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the mass storage 416 may constitute machine readable media.

While the machine-readable storage medium 422 is illustrated as a single medium, the term "machine readable medium" may include a single medium or multiple media (e.g., a centralized or distributed database, and/or associated caches and servers) that configured to store the one or more instructions 424.

The term "machine-readable storage medium" may include any tangible medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes and Examples

Example 1 may include subject matter (such as an apparatus, device, machine, target machine, or system) comprising at least one processor and a secure execution environment. The at least one processor may be arranged to request a website and access the website in response to an website access initiation from an authorization module on a server. The a secure execution environment may be arranged to store a device-stored uniform resource identifier, send the device-stored uniform resource identifier to the authorization module, receive a server-stored uniform resource identifier from the authorization module, and send a validity determination to the authorization module in response to a validation of the server-stored uniform resource identifier by the secure execution environment, the website access initiation being based on the validity determination.

In Example 2, the subject matter of Example 1 may optionally include, wherein to send the device-stored uniform resource identifier includes the secure execution environment arranged to send an encryption of the device-stored uniform resource identifier.

In Example 3, the subject matter of one or any of Examples 1-2 may optionally include, wherein the validation of the server-stored uniform resource identifier includes the server execution environment arranged to compare the server-stored uniform resource identifier to the device-stored uniform resource identifier and make the validity determination valid if they match and invalid otherwise.

In Example 4, the subject matter of one or any of Examples 1-3 may optionally include, wherein to receive the server-stored uniform resource identifier includes the server execution environment arranged to receive an encryption of the server-stored uniform resource identifier.

In Example 5, the subject matter of one or any of Examples 1-4 may optionally include, wherein to access the website includes the processor arranged to access account information associated with an account of a user of the device.

In Example 6, the subject matter of one or any of Examples 1-5 may optionally include, wherein the secure execution environment is further arranged to send a provisioning request to the authorization module to configure the device to securely access the website, the provisioning request including credentials of a user having an account associated with the website, and receive the device-stored uniform resource identifier after the authorization module has determined that the credentials are valid and that the device is associated with the user.

In Example 7, the subject matter of one or any of Examples 1-6 may optionally include, wherein the request includes an indicator to use device-specific authentication, the authorization module sending the server-stored uniform resource identifier based on the indicator.

In Example 8, the subject matter of one or any of Examples 1-7 may optionally include, wherein the device-stored uniform resource identifier is arranged to provide access to the website for a particular period of time.

In Example 9, the subject matter of one or any of Examples 1-8 may optionally include, wherein the secure execution environment is arranged to deny access to the website by the processor.

Example 10 may include, or may optionally be combined with the subject matter of one or any combination of Examples 1-9 to include, subject matter (such as a method, means for performing acts, or machine-readable medium including instructions that, when performed by a machine cause the machine to performs acts) comprising responsive to a request to access a website using a device having a secure execution environment, the device arranged to use a client platform root of trust, sending to a server a device-stored web address stored at the secure execution environment, the device-stored web address being specific to the device, receiving at the secure execution environment on the device, a server-stored web address stored at the server, the server-stored web address being specific to the device, determining, via the secure execution environment, whether the server-stored web address is valid, and initiating access to the website if the server-stored web address is valid and if the server determines that the device-stored web address is valid.

In Example 11, the subject matter of Example 10 may optionally include, wherein accessing the website includes accessing account information associated with an account of a user.

In Example 12, the subject matter of one or any of Examples 10-11 may optionally include, wherein the server-stored web address is valid if the server-stored web address matches the device-stored web address.

In Example 13, the subject matter of one or any of Examples 10-12 may optionally include, wherein sending the device-stored web address includes sending an encryption of the device-stored web address.

In Example 14, the subject matter of one or any of Examples 10-13 may optionally include, wherein receiving the server-stored web address includes receiving an encryption of the server-stored web address.

In Example 15, the subject matter of one or any of Examples 10-14 may optionally include, sending to the server a request to configure the device to securely access the website including sending credentials of a user having an account associated with the website, receiving at the secure execution environment the device-stored web address after the server has determined that the credentials are valid and that the device is associated with the user, and storing the device-stored web address at the secure execution environment.

In Example 16, the subject matter of one or any of Examples 10-15 may optionally include, wherein the request to access the website includes an indicator indicating the secure execution environment stores the device-stored web address, the server-stored web address being received based on the indicator.

In Example 17, the subject matter of one or any of Examples 10-16 may optionally include, wherein the access to the website is provided by the server for a period of time.

In Example 18, the subject matter of one or any of Examples 10-17 may optionally include denying, via the secure execution environment, access to the website if the server-stored web address is invalid.

Example 19 may include, or may optionally be combined with the subject matter of one or any combination of Examples 1-18 to include, subject matter (such as an apparatus, device, machine, or system) comprising an authorization module for device-specific web authentication. The authorization module may be arranged to receive a request to access a website from a device having a secure execution environment, receive a device-stored uniform resource identifier from the device, the device-stored uniform resource identifier being stored in the secure execution environment, send a server-stored uniform resource identifier to the secure execution environment, and provide access to the website in response to a determination that the device-stored uniform resource identifier is valid and in response to a determination by the secure execution environment that the server-stored uniform resource identifier is valid.

In Example 20, the subject matter of Example 19 may optionally include, wherein the website includes account information associated with an account of a user.

In Example 21, the subject matter of one or any of Examples 19-20 may optionally include, wherein the determination that the device-stored uniform resource identifier is valid includes the authorization module arranged to compare the device-stored uniform resource identifier to the server-stored uniform resource identifier and find it valid if they match and invalid otherwise.

In Example 22, the subject matter of one or any of Examples 19-21 may optionally include, wherein to receive the device-stored uniform resource identifier includes the authorization module arranged to receive an encryption of the device-stored uniform resource identifier.

In Example 23, the subject matter of one or any of Examples 19-22 may optionally include, wherein to send the server-stored uniform resource identifier includes the authorization module arranged to send an encryption of the server-stored uniform resource identifier.

In Example 24, the subject matter of one or any of Examples 19-23 may optionally include, wherein the authorization module is further arranged to receive a provisioning request from the device to configure the device to securely access the website, the provisioning request including credentials of a user having an account associated with the website, generate the device-stored uniform resource identifier in response to a determination that the credentials are valid and that the device is associated with the user, and send the device-stored uniform resource identifier to the secure execution environment.

In Example 25, the subject matter of one or any of Examples 19-24 may optionally include, wherein to generate the device-stored uniform resource identifier include the authorization module arranged to generate the device-stored uniform resource identifier based on a one-time password algorithm.

In Example 26, the subject matter of one or any of Examples 19-25 may optionally include, wherein the request to access the website includes an indicator to use device-specific authentication, and wherein the authorization module is arranged to send the server-stored uniform resource identifier to the secure execution environment in response to the indicator.

In Example 27, the subject matter of one or any of Examples 19-26 may optionally include, wherein to provide access to the website includes the authorization module arranged to provide access to the website for a particular period of time.

Example 28 may include, or may optionally be combined with the subject matter of one or any combination of Examples 1-27 to include, subject matter (such as a method, means for performing acts, or machine-readable medium including instructions that, when performed by a machine cause the machine to performs acts) comprising receiving at a server a device-stored web address stored at the secure environment, the device-stored web address being a web address specific to the device, the device arranged to use a client platform root of trust, sending from the server to the secure execution environment on the device a server-stored web address stored at the server, determining, via the server, whether the device-stored web address is valid, and providing access to the website if the device-stored web address is valid and if the secure execution environment of the device determines that the server-stored web address is valid.

In Example 29, the subject matter of Example 28 may optionally include, wherein providing access to the website includes providing access to account information associated with an account of a user.

In Example 30, the subject matter of one or any of Examples 28-29 may optionally include, wherein the device-stored web address is valid if the device-stored web address matches the server-stored web address.

In Example 31, the subject matter of one or any of Examples 28-30 may optionally include, wherein sending the server-stored web address includes sending an encryption of the server-stored web address.

In Example 32, the subject matter of one or any of Examples 28-31 may optionally include, wherein receiving the device-stored web address includes receiving an encryption of the device-stored web address.

In Example 33, the subject matter of one or any of Examples 28-32 may optionally include, receiving at the server a request to configure the device to securely access the website including receiving credentials of a user having an account associated with the website, determining whether the credentials are valid and whether the device is associated with the user, generating the device-stored web address if the credentials are valid and if the device is associated with the user, and sending to the secure execution environment the device-stored web address, wherein the device-stored web address is stored at the secure execution environment.

In Example 34, the subject matter of one or any of Examples 28-33 may optionally include, wherein the request to access the website includes an indicator indicating the secure execution environment stores the device-stored web address, the server-stored web address being sent based on the indicator.

In Example 35, the subject matter of one or any of Examples 28-34 may optionally include, wherein providing access to the website includes providing access to the website for a period of time.

In Example 36, the subject matter of one or any of Examples 28-35 may optionally include, denying, via the server, access to the website if the device-stored web address is invalid.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A device for device-specific web authentication, the device comprising:
   at least one processor arranged to:
   request a website to be accessed; and access the website in response to a website access initiation from an authorization module on a server; and a secure execution environment arranged to:
store a device-stored uniform resource identifier representing an address of the website to be accessed;
send the device-stored uniform resource identifier to the authorization module;
receive a server-stored uniform resource identifier representing the address of the website to be accessed from the authorization module;
compare the server-stored uniform resource identifier to the device-stored uniform resource identifier and make a validity determination valid if they match and invalid otherwise;
send the validity determination to the authorization module in response to a validation of the server-stored uniform resource identifier by the secure execution environment, the website access initiation being based on the validity determination;
send a provisioning request to the authorization module to configure the device to securely access the website, the provisioning request including credentials of a user having an account associated with the website; and
receive the device-stored uniform resource identifier after the authorization module has determined that the credentials are valid and that the device is associated with the user.

2. The device of claim 1, wherein to send the device-stored uniform resource identifier includes the secure execution environment arranged to send an encryption of the device-stored uniform resource identifier.

3. The device of claim 1, wherein to receive the server-stored uniform resource identifier includes the server execution environment arranged to receive an encryption of the server-stored uniform resource identifier.

4. The device of claim 1, wherein to access the website includes the processor arranged to access account information associated with an account of a user of the device.

5. The device of claim 1, wherein the request includes an indicator to use device-specific authentication, the authorization module sending the server-stored uniform resource identifier based on the indicator.

6. The device of claim 1, wherein the device-stored uniform resource identifier is arranged to provide access to the website for a particular period of time.

7. The device of any one of claim 1, wherein the secure execution environment is arranged to deny access to the website by the processor.

8. A method for web authentication, the method comprising:
responsive to a request to access a website using a device having a secure execution environment, the device arranged to use a client platform root of trust, sending to a server a device-stored web address of the website stored at the secure execution environment, the device-stored web address being specific to the device;
receiving at the secure execution environment on the device, a server-stored web address of the website as stored at the server, the server-stored web address being specific to the device;
determining, via the secure execution environment, whether the server-stored web address is valid, including comparing the server-stored web address to the device-stored web address and making a validity determination valid if they match and invalid otherwise;
initiating access to the website if the server-stored web address is valid and if the server determines that the device-stored web address is valid;
sending to the server a request to configure the device to securely access the website including sending credentials of a user having an account associated with the website;
receiving at the secure execution environment the device-stored web address after the server has determined that the credentials are valid and that the device is associated with the user; and
storing the device-stored web address at the secure execution environment.

9. The method of claim 8, wherein accessing the website includes accessing account information associated with an account of a user.

10. The method of claim 8, wherein the server-stored web address is valid if the server-stored web address matches the device-stored web address.

11. The method of claim 8, wherein sending the device-stored web address includes sending an encryption of the device-stored web address.

12. The method of claim 8, wherein receiving the server-stored web address includes receiving an encryption of the server-stored web address.

13. The method of claim 8, wherein the request to access the website includes an indicator indicating the secure execution environment stores the device-stored web address, the server-stored web address being received based on the indicator.

14. The method of claim 8, wherein the access to the website is provided by the server for a period of time.

15. The method of claim 8, further comprising denying, via the secure execution environment, access to the website if the server-stored web address is invalid.

16. At least one non-transitory machine-readable medium comprising a plurality of instructions that, in response to being executed on a computing device, cause the computing device to perform the method according to claim 8.

17. An apparatus including at least one processor arranged to perform the method according to claim 8.

18. An authorization module for device-specific web authentication, the authorization module arranged to:
receive a provisioning request to access a website from a device having a secure execution environment, the provisioning request to configure the device to securely access the website, and the provisioning request including credentials of a user having an account associated with the website;
perform a validation of whether the credentials are valid and that the device is associated with the user and, in response to a positive validation send a uniform resource identifier to be stored in the secure execution environment of the device as a device-stored uniform resource identifier, and representing an address of the website;
thereafter, receive the device-stored uniform resource identifier from the device, the device-stored uniform resource identifier being stored in the secure execution environment and representing an address of the website;
send a server-stored uniform resource identifier to the secure execution environment, the server-stored uniform resource identifier representing the address of the website; and
provide access to the website in response to a determination that the device-stored uniform resource identifier is valid and in response to a comparison of the server-stored web address to the device-stored web address to produce a determination by the secure execution environment that the server-stored uniform resource identifier is valid;

wherein the determination that the device-stored uniform resource identifier is valid is provided by the authorization module being arranged to compare the device-stored uniform resource identifier to the server-stored uniform resource identifier and find it valid if they match and invalid otherwise.

19. The authorization module of claim 18, wherein the website includes account information associated with an account of a user.

20. A method for web authentication to control access to a web site, the method comprising:

receiving at a server a device-stored web address of the website stored at a secure environment, the device-stored web address being a web address specific to the device, the device arranged to use a client platform root of trust;

sending from the server to the secure execution environment on the device a server-stored web address of the website stored at the server;

determining, via the server, whether the device-stored web address is valid;

providing access to the website if the device-stored web address is valid and if the secure execution environment of the device determines that the server-stored web address is valid based on a comparison between the server-stored web address to the device-stored web address;

receiving at the server a request to configure the device to securely access the website including receiving credentials of a user having an account associated with the website;

determining whether the credentials are valid and whether the device is associated with the user;

generating the device-stored web address if the credentials are valid and if the device is associated with the user; and sending to the secure execution environment the device-stored web address, wherein the device-stored web address is stored at the secure execution environment.

* * * * *

UNITED STATES PATENT AND TRADEMARK OFFICE
CERTIFICATE OF CORRECTION

PATENT NO. : 9,887,997 B2
APPLICATION NO. : 13/992811
DATED : February 6, 2018
INVENTOR(S) : Prakash et al.

Page 1 of 1

It is certified that error appears in the above-identified patent and that said Letters Patent is hereby corrected as shown below:

In the Claims

In Column 13, Line 48, in Claim 7, after "of", delete "any one of"

In Column 15, Line 15, in Claim 20, delete "web site," and insert --website,-- therefor Signed and Sealed this
Eighth Day of October, 2019

Andrei Iancu
*Director of the United States Patent and Trademark Office*